(12) United States Patent
Jeong et al.

(10) Patent No.: US 9,882,294 B1
(45) Date of Patent: Jan. 30, 2018

(54) CONNECTOR FOR CONNECTING MOTOR WITH THREE PHASE POWER

(71) Applicant: Hyundai Motor Company, Seoul (KR)

(72) Inventors: MyungKyu Jeong, Seoul (KR); GaEun Lee, Seongnam-si (KR); Young Jin Seo, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/377,955

(22) Filed: Dec. 13, 2016

(30) Foreign Application Priority Data

Oct. 24, 2016 (KR) .......................... 10-2016-0138363

(51) Int. Cl.
*H01R 9/24* (2006.01)
*H02K 5/22* (2006.01)
*H01R 9/22* (2006.01)
*H01R 9/18* (2006.01)

(52) U.S. Cl.
CPC ............. *H01R 9/2416* (2013.01); *H01R 9/18* (2013.01); *H01R 9/223* (2013.01); *H02K 5/225* (2013.01)

(58) Field of Classification Search
CPC ........ H01R 9/2416; H01R 9/18; H01R 9/223; H02K 5/225

USPC .......................................................... 439/91
See application file for complete search history.

(56) References Cited

U.S. PATENT DOCUMENTS

2011/0058391 A1* 3/2011 Ueno ..................... H02M 7/003
363/13
2016/0036290 A1 2/2016 Chang

FOREIGN PATENT DOCUMENTS

| JP | H0724783 | Y2 | 6/1995 |
| JP | 20079790 | A | 1/2007 |
| KR | 100937392 | B1 | 1/2010 |
| KR | 1020130132320 | A | 12/2013 |
| KR | 1020160016192 | A | 2/2016 |

* cited by examiner

*Primary Examiner* — Harshad C Patel
(74) *Attorney, Agent, or Firm* — Slater Matsil, LLP

(57) ABSTRACT

A connector for connecting a motor is provided. The connector for connecting a motor for electrically connecting a three phase coil connecting portion that is drawn out from a motor and a three phase power terminal that is connected with a power cable includes: i) a under terminal block that houses the each power terminal and the each coil connecting portion; ii) an upper terminal block that is coupled to the under terminal block and that presses the each power terminal and the each coil connecting portion; and iii) an engagement portion that engages the under terminal block and the upper terminal block.

18 Claims, 5 Drawing Sheets

CONNECTOR FOR CONNECTING MOTOR WITH THREE PHASE POWER

CROSS-REFERENCE TO RELATED APPLICATIONS

This application claims priority to and the benefit of Korean Patent Application No. 10-2016-0138363 filed in the Korean Intellectual Property Office on Oct. 24, 2016, the entire contents of which are incorporated herein by reference.

TECHNICAL FIELD

The present invention relates to a drive motor for an environmentally-friendly vehicle.

BACKGROUND

In general, a hybrid vehicle or an electric vehicle that is referred to as an environmentally-friendly vehicle may generate a driving torque by an electric motor (hereinafter, referred to as a "drive motor") that obtains a torque with electrical energy.

The hybrid vehicle runs in an Electric Vehicle (EV) mode, which is a pure electric vehicle mode using only power of a drive motor or a Hybrid Electric Vehicle (HEV) mode using an entire torque of an engine and a drive motor as power. A general electric vehicle runs using a torque of a drive motor as power.

In this way, a drive motor that is applied to an environmentally-friendly vehicle basically has a stator and a rotor. For example, the stator is coupled within a motor housing, and the rotor is disposed at a predetermined gap within the stator.

The stator of the drive motor is formed with a stator core that is formed by layering electric steel sheets and a stator coil that is wound in slots of the stator core. Accordingly, when an AC current is applied to the stator coil, a rotation magnetic field may occur at the stator, and a rotation torque may occur at the rotor by the rotation magnetic field.

The drive motor may be classified into a distribution winding type drive motor and a concentration winding type drive motor according to a winding method of the stator coil, and a stator of the distribution winding type drive motor variously exists according to a winding method of the stator coil, but a distribution winding coil stator is a representative coil stator.

The distribution winding coil stator forms a coil connecting portion in which a stator coil is connected in three phases. The three phase coil connecting portion is formed with several strands of coils and is connected with a three phase power cable terminal.

In the conventional art, a method of connecting a three phase coil connecting portion and a power cable terminal may use, for example a tube form of phase terminal. The phase terminal is connected with a coil of the coil connecting portion with a pressing method and is electrically connected with a power cable terminal through a bolt.

In the foregoing description, a method of an example that connects the phase terminal with the coil connecting portion includes a method of fusing bonding the phase terminal while pressing in a state in which the coil connecting portion is inserted into the phase terminal and in which the coil connecting portion is fixed to the phase terminal by pre-caulking the phase terminal.

However, in a conventional method of connecting a coil, it is inconvenient that the phase terminal should be pressed and fusing bonded, and there is a drawback that the work number increases and that expensive fusing bonding equipment is required and that each connected three phase coil connecting portion and power terminal should be insulating processed.

The above information disclosed in this Background section is only for enhancement of understanding of the background of the invention and therefore it may contain information that does not form the prior art that is already known in this country to a person of ordinary skill in the art.

SUMMARY

The present invention relates to a drive motor for an environmentally-friendly vehicle. In particular embodiments, the present invention relates to a connector for connecting a motor that connects a three phase coil connecting portion and a high voltage of power cable terminal.

Embodiments of the present invention provide a connector for connecting a motor having advantages of being capable of deleting a separate connection terminal that connects a three phase coil connecting portion and a power terminal and a pressing/fusing bonding process of the connection terminal and not requiring a separate insulating processing of each connected three phase coil connecting portion and power terminal.

An example embodiment of the present invention provides a connector for connecting a motor for electrically connecting a three phase coil connecting portion that is drawn out from a motor and a three phase power terminal that is connected with a power cable. An under terminal block houses each power terminal and each coil connecting portion. An upper terminal block is coupled to the under terminal block and presses each power terminal and each coil connecting portion. An engagement portion engages the under terminal block and the upper terminal block.

At an upper surface of the under terminal block, a receiving groove that houses the power terminal and the coil connecting portion and a drawn-out groove that is connected with the receiving groove and that draws out the coil connecting portion to one side end of the under terminal block may be formed.

At the other side end of the under terminal block, a leading hole for leading the each power terminal into the receiving groove may be formed.

At a low surface of the upper terminal block, a pressing protrusion that couples to a receiving groove of the under terminal block and that presses the each power terminal and the each coil connecting portion that are housed at the receiving groove may be formed.

The drawn-out groove may be formed as a drawn-out hole that draws out the coil connecting portion by a low surface of the upper terminal block upon coupling the under terminal block and the upper terminal block.

The engagement portion may include at least one engagement bolt that engages the coupled under terminal block and upper terminal block.

At the upper terminal block, at least one engagement hole in which the engagement bolt penetrates and is engaged may be formed.

At the under terminal block, an engagement groove that engages the engagement bolt that penetrates the engagement hole may be formed.

The under terminal block and the upper terminal block may be made of an insulating material.

Another embodiment of the present invention provides a connector for connecting a motor for electrically connecting a three phase coil connecting portion that is drawn out from a motor and a three phase power terminal that is connected with a power cable including: i) a connector housing; ii) an under terminal block that is fixedly installed at a bottom surface of the connector housing and that houses the each power terminal and the each coil connecting portion; iii) an upper terminal block that is coupled to the under terminal block and that presses the each power terminal and the each coil connecting portion; and iv) an engagement portion that engages the under terminal block and the upper terminal block.

At an upper surface of the under terminal block, a quadrangular-shaped receiving groove that houses the power terminal and the coil connecting portion and a drawn-out groove that is connected with the receiving groove and that draws out the coil connecting portion to one side end of the under terminal block may be formed.

At the other side end of the under terminal block, a leading hole for leading the each power terminal into the receiving groove may be formed.

At the connector housing, a power connection portion that is connected with the each power terminal and that is connected with the power cable may be installed.

At a low surface of the upper terminal block, a quadrangular-shaped pressing protrusion that couples to a receiving groove of the under terminal block and that presses the each power terminal and the each coil connecting portion that are housed at the receiving groove may be formed.

At an upper surface of an end portion of the other side of the under terminal block, a latch stage corresponding to a thickness of the upper terminal block may be formed.

In exemplary embodiments of the present invention, an under terminal block and an upper terminal block are engaged with an engagement portion with a three phase coil connecting portion and a power terminal interposed between the under terminal block and the upper terminal block, and the coil connecting portion and the power terminal can be pressed with an engagement force of the engagement portion and can be electrically connected.

Therefore, in an exemplary embodiment of the present invention, because a separate connection terminal that connects a three phase coil connecting portion and a power terminal and a pressing/fusing bonding process of the connection terminal may be deleted, a cost can be reduced and the work number and a cycle time can be reduced.

Further, in an exemplary embodiment of the present invention, by electrically connecting a coil connecting portion and a power terminal through an under terminal block and an upper terminal block of an insulating material, insulating reliability can be improved without a separate insulating processing of the coil connecting portion and the power terminal.

In addition, an effect that may be obtained or estimated due to an exemplary embodiment of the present invention is directly or implicitly described in a detailed description of an exemplary embodiment of the present invention. That is, various effects that are estimated according to an exemplary embodiment of the present invention will be described within a detailed description to be described later.

BRIEF DESCRIPTION OF THE DRAWINGS

The drawings are illustrated for describing an exemplary embodiment of the present invention and thus the scope of the present invention should not be analyzed to be limited to the accompanying drawings.

Figure 1:
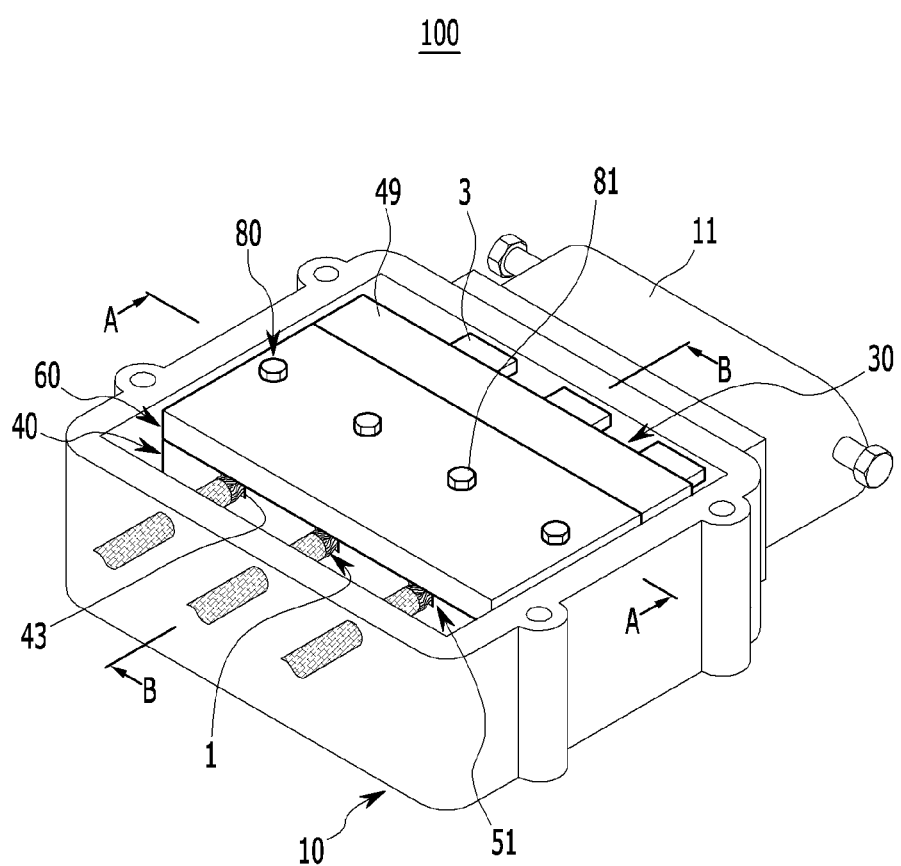
FIG. 1 is a coupled perspective view illustrating a connector for connecting a motor according to an exemplary embodiment of the present invention.

The following reference symbols can be used in conjunction with the drawings:

| 1  | coil connecting portion | 3  | power terminal |
|----|-------------------------|----|----------------|
| 10 | connector housing       | 11 | power connecting portion |
| 30 | terminal block assembly | 40 | under terminal block |
| 41 | receiving groove        | 43 | drawn-out groove |
| 45 | leading hole            | 49 | latch stage |
| 51 | drawn-out hole          | 60 | upper terminal block |
| 61 | pressing protrusion     | 80 | engagement portion |
| 81 | engagement bolt         | 83 | engagement hole |
| 85 | engagement groove       |    |                |

DETAILED DESCRIPTION OF ILLUSTRATIVE EMBODIMENTS

Hereinafter, the present invention will be described more fully hereinafter with reference to the accompanying drawings, in which example embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are randomly represented for better understanding and ease of description and the present invention is not limited thereto and the thickness of several portions and areas are exaggerated for clarity.

In the following description, dividing names of components into first, second and the like is to divide the names because the names of the components are the same as each other and an order thereof is not particularly limited.

In addition, in an entire specification, unless explicitly described to the contrary, the word "comprise" and variations such as "comprises" or "comprising" will be understood to imply the inclusion of stated elements but not the exclusion of any other elements.

In addition, the terms ". . . unit", ". . . means", ". . . unit", and ". . . member" described in the specification mean units for processing at least one function and operation.

FIG. 1 is a coupled perspective view illustrating a connector for connecting a motor according to an exemplary embodiment of the present invention.

Referring to FIG. 1, a motor connection connector 100 according to an exemplary embodiment of the present invention may be applied to a drive motor for a hybrid vehicle and/or an electric vehicle that obtains a driving torque with electrical energy in an environmentally-friendly vehicle.

For example, the drive motor is an inner rotor type synchronous motor and includes a motor housing (not shown), a stator that is installed within the motor housing, and a rotor that is rotatably installed within the stator at a predetermined gap from the stator.

Here, a drive motor that is applied to an exemplary embodiment of the present invention may include a Permanent Magnet Synchronous Motor (PMSM) in which a permanent magnet is embedded in a rotor or a Wound Rotor Synchronous Motor (WRSM) in which a rotor coil is wound in a rotor.

As described above, it is described that a drive motor that is applied to an exemplary embodiment of the present invention is adapted to an environmentally-friendly vehicle, but it should not be understood that the scope of the present invention is always limited thereto and the spirit and scope of the present invention may be applied to various kinds and uses of drive motors.

The stator of the drive motor includes a motor connection connector 100 according to an exemplary embodiment of the present invention that connects three phase coils that are drawn out in three phases (u, v, w) in a stator coil and that electrically connects a connecting portion thereof with the three phase power cable.

The motor connection connector 100 electrically connects a three phase coil connecting portion 1 that is drawn out into several strands from a stator coil of a stator and a power terminal 3 (referred to as a "power cable terminal" in the art) that is connected with a power cable (not shown).

The motor connection connector 100 according to an exemplary embodiment of the present invention may delete a separate connection terminal that connects the three phase coil connecting portion 1 and the power terminal 3 and a pressing/fusing bonding process of the connection terminal and is formed in a structure that does not require a separate insulating processing of the each connected three phase coil connecting portion 1 and the power terminal 3.

For this reason, the motor connection connector 100 according to an exemplary embodiment of the present invention basically includes a connector housing 10 and a terminal block assembly 30 and a configuration thereof will be described as follows.

Figure 2:
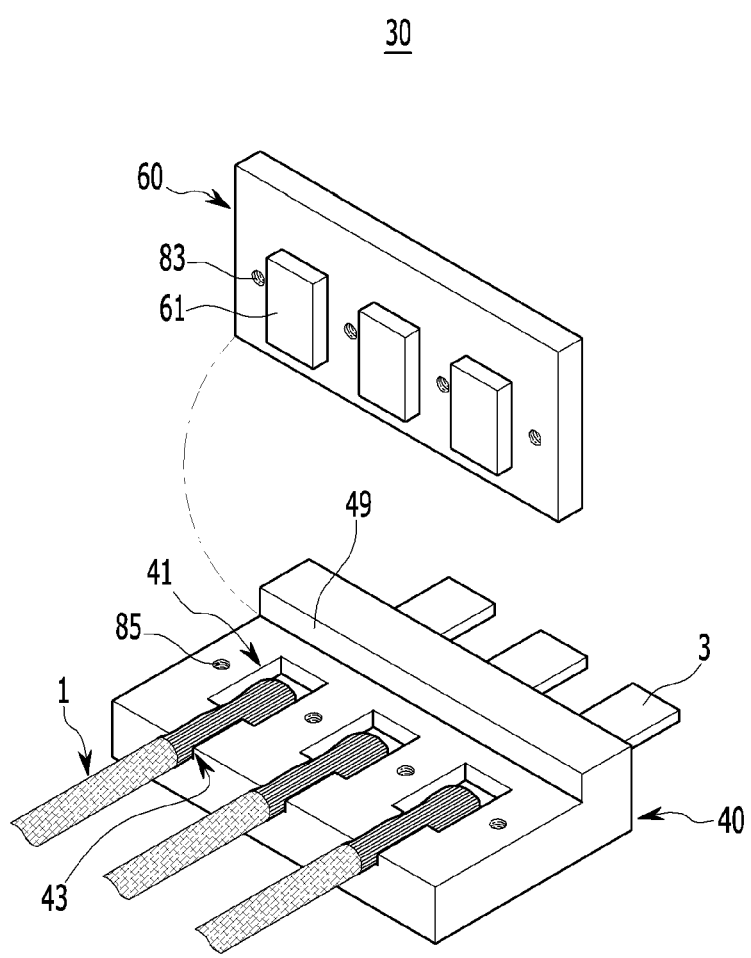
FIG. 2 is a partially exploded perspective view illustrating a terminal block assembly that is applied to a connector for connecting a motor according to an exemplary embodiment of the present invention.
Figure 3:
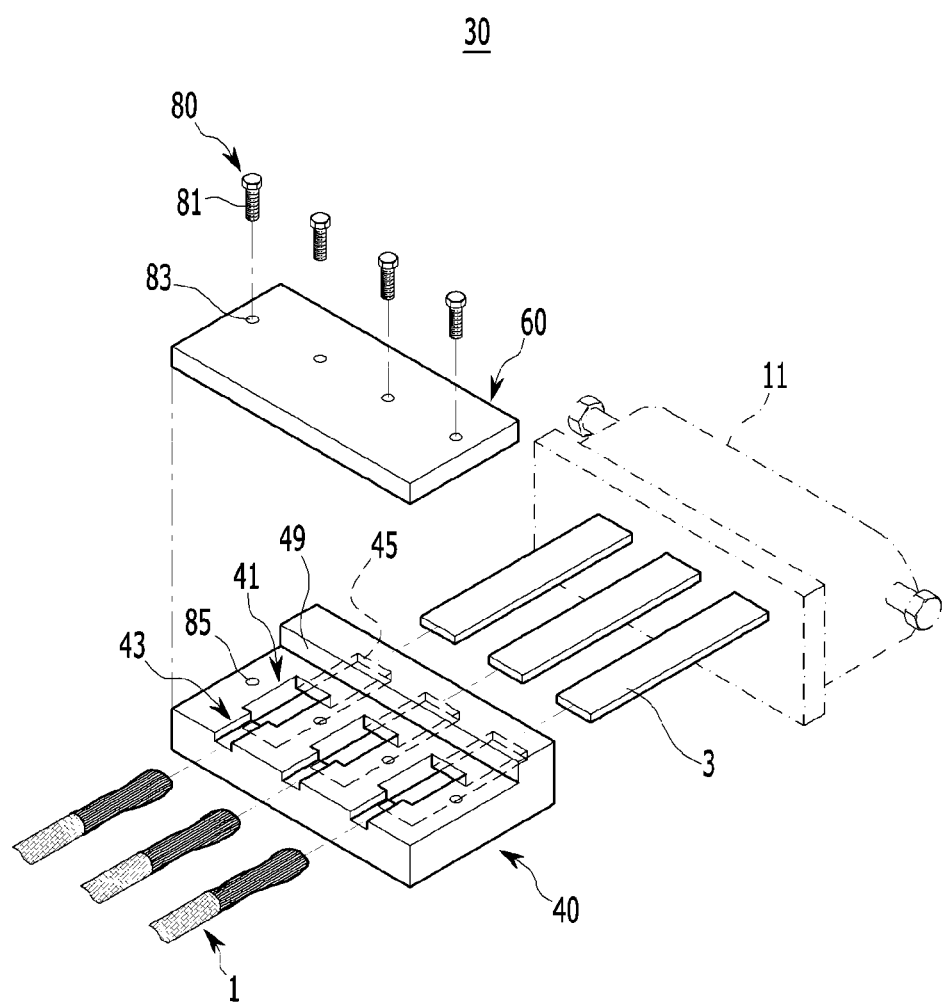
FIG. 3 is an entire exploded perspective view illustrating a terminal block assembly that is applied to a connector for connecting a motor according to an exemplary embodiment of the present invention.
Figure 4:
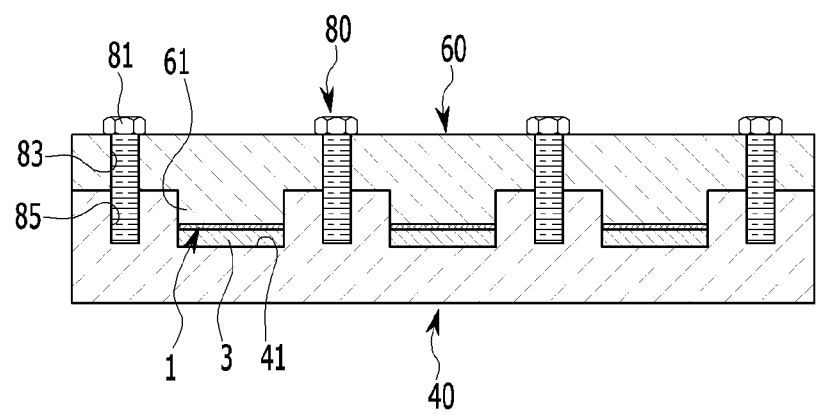
FIG. 4 is a cross-sectional view illustrating the connector taken along line A-A of FIG. 1.
Figure 5:
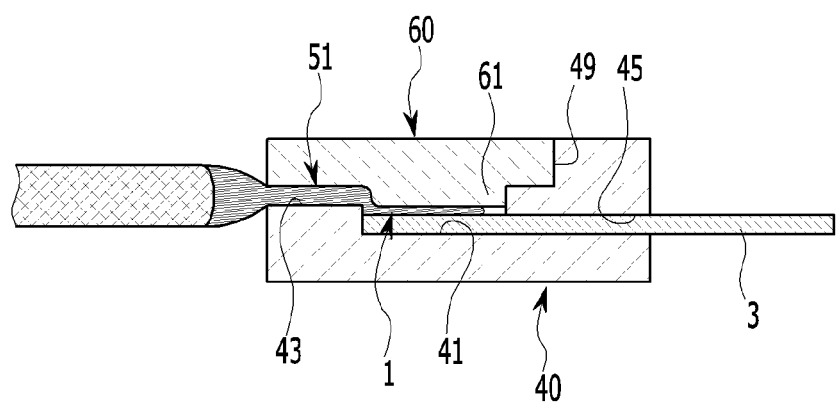
FIG. 5 is a cross-sectional view illustrating the connector taken along line B-B of FIG. 1.

FIGS. 2 and 3 are a partially exploded perspective view and an entire exploded perspective view illustrating a terminal block assembly that is applied to a connector for connecting a motor according to an exemplary embodiment of the present invention, FIG. 4 is a cross-sectional view illustrating the connector taken along line A-A of FIG. 1, and FIG. 5 is a cross-sectional view illustrating the connector taken along line B-B of FIG. 1.

Referring to FIGS. 1 to 5, in an exemplary embodiment of the present invention, the connector housing 10 houses the terminal block assembly 30 to be described later, forms an upper end opening portion and a bottom surface, and may include a cover (not shown) that covers the upper end opening portion.

Here, the connector housing 10 leads the power terminal 3 that is connected with the three phase coil connecting portion 1 that is drawn out from a stator coil and a three phase power cable (not shown) from the outside to the inside.

In the connector housing 10, a power connecting portion 11 for electrically connecting each power terminal 3 with the power cable is installed. The power connecting portion 11 is connected with the power terminal 3, leads the power terminal 3 into the connector housing 10, and is coupled to an outer wall surface of the connector housing 10. The power connecting portion 11 is coupled with a male and female method to a connecting member (not shown) that is connected with the power cable and may electrically connect the power terminal 3 and the power cable.

The terminal block assembly 30 electrically connects the three phase coil connecting portion 1 and each power terminal 3 and is installed within the connector housing 10 in an exemplary embodiment of the present invention. Such a terminal block assembly 30 includes an under terminal block 40, an upper terminal block 60, and an engagement portion 80.

In an exemplary embodiment of the present invention, the under terminal block 40 is made of an insulating material and is fixedly installed at a bottom surface of the connector housing 10. For example, the under terminal block 40 may be coupled with a one touch method through a hook protrusion and a hook groove at a bottom surface of the connector housing 10, may be fixed with an adhesive method to a bottom surface thereof, and may be engaged with the bottom surface through an engagement means such as a bolt.

The under terminal block 40 has a structure that can house each power terminal 3 and the three phase coil connecting portion 1 at an upper surface. For this reason, at an upper surface of the under terminal block 40, the three receiving grooves 41 that house the each power terminal 3 and the coil connecting portion 1 are formed.

For example, the receiving groove 41 may be formed in a quadrangular-shaped groove at an upper surface of the under terminal block 40, the power terminal 3 may be housed at a bottom surface of a groove thereof, and a connecting end portion of the coil connecting portion 1 may be placed on the power terminal 3.

At an upper surface of the under terminal block 40, a drawn-out groove 43 that is connected with the receiving groove 41 is formed. The drawn-out groove 43 is formed in a groove of a width smaller than that of the receiving groove 41. The drawn-out groove 43 is provided with a drawn-out passage that draws out a portion, except for a connecting end portion of the coil connecting portion 1 to one side end of the under terminal block 40. That is, the drawn-out groove 43 is provided as a groove that is connected from the receiving groove 41 to one side end at an upper surface of the under terminal block 40.

Further, as described above, at the other side end of the under terminal block 40, a leading hole 45 for leading the power terminal 3 that is leaded into the connector housing 10 into the receiving groove 41 is formed. The leading hole 45 is a penetrate hole that can insert the power terminal 3 into a bottom surface of the receiving groove 41 and is formed in a shape corresponding to a cross-section of the power terminal 3.

In an exemplary embodiment of the present invention, the upper terminal block 60 is made of the same insulating material as that of the under terminal block 40. The upper terminal block 60 is substantially coupled to the under terminal block 40 and is formed in a structure that can press a connecting end portion of the coil connecting portion 1 and the power terminal 3 that are housed in the receiving groove 41 of the under terminal block 40.

For this reason, at a low surface of the upper terminal block 60, a pressing protrusion 61 that couples to the receiving groove 41 of the under terminal block 40 and that presses a connecting end portion of the coil connecting portion 1 and the power terminal 3 that are housed in the receiving groove 41 is formed. For example, the pressing protrusion 61 may be protruded in a quadrangular form at a low surface of the upper terminal block 60 and may be coupled with a male and female method to the receiving groove 41 of the under terminal block 40.

Here, the pressing protrusion 61 is coupled to the receiving groove 41 and presses a connecting end portion of the coil connecting portion 1 and the power terminal 3 that are housed in the receiving groove 41, and a low surface of the upper terminal block 60 is provided in a thickness that can contact an upper surface of the under terminal block 40.

In the under terminal block 40, at an upper surface of an end portion of the other side, a latch stage 49 corresponding to a thickness of the upper terminal block 60 is formed. The latch stage 49 is formed at the end portion side of the other side at an upper surface of the under terminal block 40. The latch stage 49 is provided with a stepped latch jaw by a thickness corresponding to the upper terminal block 60 at an upper surface of the under terminal block 40.

As described above, upon coupling the under terminal block 40 and the upper terminal block 60, the drawn-out groove 43 of the under terminal block 40 is formed as a drawn-out hole 51 that draws out the coil connecting portion 1 by a low surface of the upper terminal block 60. That is, upon coupling the under terminal block 40 and the upper terminal block 60, as a low surface of the upper terminal block 60 contacts an upper surface of the under terminal block 40, the drawn-out hole 51 is formed between a low surface of the upper terminal block 60 and the drawn-out groove 43.

In an exemplary embodiment of the present invention, the engagement portion 80 engages the under terminal block 40 and the upper terminal block 60 that are coupled through the receiving groove 41 and the pressing protrusion 61.

The engagement portion 80 includes at least one engagement bolt 81 that engages the coupled under terminal block 40 and upper terminal block 60. The engagement bolt 81 is provided in the plural, and the engagement bolts 81 may be engaged with a portion, except for the receiving groove 41 and the pressing protrusion 61 of the under terminal block 40 and the upper terminal block 60. For example, the engagement bolts 81 may be engaged with both side edges of the under terminal block 40 and the upper terminal block 60 and between the receiving groove 41 and the pressing protrusion 61.

For this reason, at the upper terminal block 60, an engagement hole 83 is formed in which the engagement bolt 81 penetrates and is engaged. At the under terminal block 40, an engagement groove 85 that engages the engagement bolt 81 that penetrates the engagement hole 83 is formed.

Hereinafter, a process of assembling a motor connection connector 100 according to an exemplary embodiment of the present invention having the above-described configuration will be described in detail with reference to the drawings.

First, in an exemplary embodiment of the present invention, the under terminal block 40 is coupled to a bottom surface of the connector housing 10. In this state, in an exemplary embodiment of the present invention, three power terminals 3 that are connected with the power connecting portion 11 are leaded into the connector housing 10, and the power connecting portion 11 is coupled to an outer wall surface of the connector housing 10. In this process, in an exemplary embodiment of the present invention, the power terminal 3 is inserted into the leading hole 45 of the under terminal block 40 and is inserted into a bottom surface of the receiving groove 41.

Thereafter, in an exemplary embodiment of the present invention, the three phase coil connecting portion 1 that is drawn out from a stator coil is leaded into the connector housing 10, and a connecting end portion of the coil connecting portion 1 is disposed on the power terminal 3 within the receiving groove 41 through the drawn-out groove 43 of the under terminal block 40.

In the process, a portion, except for a connecting end portion of the coil connecting portion 1 is inserted into the drawn-out groove 43, and a connecting end portion of the coil connecting portion 1 is disposed at an upper surface of the power terminal 3 in a state in which a coil is unwound. In this case, coils of the connecting end portion are disposed at an upper surface of the power terminal 3 in a state in which a film is removed.

Subsequently, in an exemplary embodiment of the present invention, the upper terminal block 60 is coupled to an upper surface of the under terminal block 40, and the pressing protrusion 61 of the upper terminal block 60 is inserted and coupled to the receiving groove 41 of the under terminal block 40.

In this case, the pressing protrusion 61 is coupled to a portion of the receiving groove 41 and supports a connecting end portion of the coil connecting portion 1 and the power terminal 3 that are housed in the receiving groove 41. A low surface of the upper terminal block 60 is in a state that is separated from an upper surface of the under terminal block 40 by a connecting end portion of the coil connecting portion 1 and the power terminal 3 that are housed in the receiving groove 41.

Thereafter, in an exemplary embodiment of the present invention, the upper terminal block 60 is pressed, and the engagement hole 83 of the upper terminal block 60 and the engagement groove 85 of the under terminal block 40 correspond.

In this state, in an exemplary embodiment of the present invention, by engaging the engagement bolt 81 with the engagement hole 83 and the engagement groove 85, the under terminal block 40 and the upper terminal block 60 are integrally fixed.

Accordingly, the pressing protrusion 61 of the upper terminal block 60 presses the power terminal 3 and a connecting end portion of the coil connecting portion 1 that is housed in the receiving groove 41 with an engagement force of the engagement bolt 81 and fixes the coil connecting portion 1 and the power terminal 3 between the under terminal block 40 and the upper terminal block 60.

Here, a low surface of the upper terminal block 60 forms a drawn-out hole 51 between a low surface of the upper terminal block 60 and the drawn-out groove 43 while contacting an upper surface of the under terminal block 40 and may fix a portion, except for a connecting end portion of the coil connecting portion 1 to the drawn-out groove 43 through the drawn-out hole 51.

As described above, in a process of engaging the under terminal block 40 and the upper terminal block 60 with the engagement bolt 81, the upper terminal block 60 supports the latch stage 49 of the under terminal block 40, and in an exemplary embodiment of the present invention, until a thickness of the latch stage 49 and a thickness of the upper terminal block 60 correspond, the engagement bolt 81 is engaged.

This prevents the upper terminal block 60 from being damaged by an excessive engagement force of the engagement bolt 81. Further, a pressing force of the power terminal 3 and a connecting end portion of the coil connecting portion 1 by the pressing protrusion 61 is prevented from being weakened with a somewhat weak engagement force of the engagement bolt 81. That is, the latch stage 49 operates as a factor that determines an appropriate engagement force of the engagement bolt 81 that fixes the under terminal block 40 and the upper terminal block 60.

Therefore, in an exemplary embodiment of the present invention, the under terminal block 40 and the upper terminal block 60 are coupled through the above-described process, and the terminal block assembly 30 that electrically connects the coil connecting portion 1 and the power terminal 3 may be assembled within the connector housing 10.

As described above, according to the motor connection connector 100 of an exemplary embodiment of the present invention, the under terminal block 40 and the upper terminal block 60 are engaged with the engagement portion 80 with the three phase coil connecting portion 1 and the power terminal 3 interposed between the under terminal block 40 and the upper terminal block 60, and the coil connecting portion 1 and the power terminal 3 are pressed with an engagement force of the engagement portion 80 and may be electrically connected.

Thereby, in an exemplary embodiment of the present invention, because a separate connection terminal that connects the three phase coil connecting portion 1 and the power terminal 3 and a pressing/fusing bonding process of the connection terminal may be deleted, a cost can be reduced, and the work number and a cycle time can be reduced.

Further, in an exemplary embodiment of the present invention, by electrically connecting the three phase coil connecting portion 1 and the power terminal 3 through the under terminal block 40 and the upper terminal block 60 of an insulating material, insulating reliability can be improved without a separate insulating processing of the coil connecting portion 1 and the power terminal 3.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A connector for connecting a motor for electrically connecting a three phase coil connecting portion that is drawn out from a motor and a three phase power terminal that is connected with a power cable, the connector comprising:
   an under terminal block that houses each power terminal of the three phase power terminal and each coil connecting portion of the three phase coil connecting portion;
   an upper terminal block that is coupled to the under terminal block and that presses each power terminal and each coil connecting portion; and
   an engagement portion that engages the under terminal block and the upper terminal block;
   wherein a receiving groove and a drawn-out groove are formed at an upper surface of the under terminal block, the receiving groove housing the power terminal and the coil connecting portion and the drawn-out groove being connected with the receiving groove and drawing out the coil connecting portion to one side end of the under terminal block.

2. The connector of claim 1, wherein a leading hole for leading each power terminal into the receiving groove is formed at another side of the under terminal block.

3. The connector of claim 1, wherein a pressing protrusion is formed at a low surface of the upper terminal block, the pressing protrusion being coupled to the receiving groove of the under terminal block and pressing each power terminal and each coil connecting portion that are housed at the receiving groove.

4. The connector of claim 3, wherein the drawn-out groove is formed as a drawn-out hole that draws out the coil connecting portion by a low surface of the upper terminal block upon coupling the under terminal block and the upper terminal block.

5. The connector of claim 1, wherein the engagement portion comprises an engagement bolt that engages the under terminal block and upper terminal block.

6. The connector of claim 5, wherein an engagement hole is formed at the upper terminal block, wherein the engagement bolt penetrates and is engaged in the engagement hole; and
   wherein an engagement groove is formed at the under terminal block, the engaging groove engaging the engagement bolt that penetrates the engagement hole.

7. The connector of claim 1, wherein the under terminal block is made of an insulating material.

8. The connector of claim 1, wherein the upper terminal block is made of an insulating material.

9. A connector for connecting a motor for electrically connecting a three phase coil connecting portion that is drawn out from a motor and a three phase power terminal that is connected with a power cable, the connector comprising:
   a connector housing;
   an under terminal block fixedly installed at a bottom surface of the connector housing, the under terminal block housing each power terminal and each coil connecting portion;
   an upper terminal block coupled to the under terminal block and pressing each power terminal and each coil connecting portion; and
   an engagement portion that engages the under terminal block and the upper terminal block;
   wherein a quadrangular-shaped receiving groove and a drawn-out groove are formed at an upper surface of the under terminal block, the quadrangular-shaped receiving groove housing the power terminal and the coil connecting portion and the drawn-out groove being connected with the quadrangular-shaped receiving groove and drawing out the coil connecting portion to one side end of the under terminal block; and
   a leading hole is formed at an other end of the under terminal block, the leading hole for leading each power terminal into the quadrangular-shaped receiving groove.

10. The connector of claim 9, wherein a power connection portion is formed at the connector housing, the power connection portion being connected with each power terminal and being connected with the power cable.

11. The connector of claim 9, wherein a quadrangular-shaped pressing protrusion is formed at a low surface of the upper terminal block, the quadrangular-shaped pressing protrusion being coupled to the quadrangular-shaped receiving groove of the under terminal block and pressing each power terminal and each coil connecting portion that are housed at the quadrangular-shaped receiving groove.

12. The connector of claim 11, wherein a latch stage is formed at an upper surface of an end portion of the other end of the under terminal block, the latch stage corresponding to a thickness of the upper terminal block.

13. A connector for connecting a motor for electrically connecting a three phase coil connecting portion that is drawn out from a motor and a three phase power terminal that is connected with a power cable, the connector comprising:
- an under terminal block that houses each power terminal of the three phase power terminal and each coil connecting portion of the three phase coil connecting portion, wherein the under terminal block is made of an insulating material;
- an upper terminal block that is coupled to the under terminal block and that presses each power terminal and each coil connecting portion, wherein the upper terminal block is made of an insulating material; and
- an engagement portion that engages the under terminal block and the upper terminal block;
- wherein a receiving groove and a drawn-out groove are formed at an upper surface of the under terminal block, the receiving groove housing the power terminal and the coil connecting portion and the drawn-out groove being connected with the receiving groove and drawing out the coil connecting portion to one side end of the under terminal block.

14. The connector of claim 13, wherein a leading hole for leading each power terminal into the receiving groove is formed at another side of the under terminal block.

15. The connector of claim 13, wherein a pressing protrusion is formed at a low surface of the upper terminal block, the pressing protrusion being coupled to the receiving groove of the under terminal block and pressing each power terminal and each coil connecting portion that are housed at the receiving groove.

16. The connector of claim 15, wherein the drawn-out groove is formed as a drawn-out hole that draws out the coil connecting portion by a low surface of the upper terminal block upon coupling the under terminal block and the upper terminal block.

17. The connector of claim 13, wherein the engagement portion comprises an engagement bolt that engages the under terminal block and upper terminal block.

18. The connector of claim 17, wherein an engagement hole is formed at the upper terminal block, wherein the engagement bolt penetrates and is engaged in the engagement hole; and
- wherein an engagement groove is formed at the under terminal block, the engaging groove engaging the engagement bolt that penetrates the engagement hole.

* * * * *